United States Patent

[11] 3,609,638

[72] Inventor John J. Darrey
540 South Creek Road, Racine, Wis. 53406
[21] Appl. No. 43,024
[22] Filed June 3, 1970
[45] Patented Sept. 28, 1971

[54] EXTENSION CORD COUPLING CLAMP ASSEMBLY
12 Claims, 2 Drawing Figs.

[52] U.S. Cl.................................................. 339/75 P,
24/81 TH, 285/363, 285/420, 287/62, 339/255 P
[51] Int. Cl............................................................H01r 13/54
[50] Field of Search............................................. 339/75,
255; 24/81; 285/363, 420; 287/60, 62

[56] References Cited
UNITED STATES PATENTS
3,005,176 10/1961 Berg............................... 339/75 P FOREIGN PATENTS
818,717 7/1969 Canada........................ 339/75 P Primary Examiner—Joseph H. McGlynn
Attorney—James E. Nilles ABSTRACT: An extension cord clamp assembly for detachably securing the ends of extension cords or cables together to prevent accidental disconnection of the plug and socket. The clamp assembly has a pair of spring-loaded, butterfly-type clamps which clamp on the cord ends, the clamps being mounted on a threaded, roughened or serrated rod to thereby hold them against relative displacement. The spring urges the clamps into tight and secure engagement with the rod, but permits ready adjustment along the rod when the butterfly wings of the clamps are squeezed together to release the jaws of the clamps.

PATENTED SEP 28 1971

3,609,638

Inventor:
John J. Darrey
By: James E. Miller
Attorney

EXTENSION CORD COUPLING CLAMP ASSEMBLY

BACKGROUND OF THE INVENTION

The invention pertains to electrical connectors or the like and more specifically to coupling means for releasably holding a socket and plug connection together. The coupling means has releasable clamps which are spring biased into locking engagement with an interconnecting rod.

Electrical conductors, such as extension cords or extension cables, utilized for transmitting electrical current from an outlet to an appliance, or a motor-driven device located at a distance from the outlet, are normally made in lengths measuring from about 10 feet to a hundred or more feet. When the appliance or device requiring electrical energy is at a distance from the outlet greater than the length of one such extension cord, it is common practice to connect together two or more extension cords to make up the required length.

The standard connector utilized for interconnecting two conventional extension cords consists of a socket portion having a pair of slots therein, and a plug portion having a pair of prongs projecting therefrom. The socket portion usually contains a pair of bent resilient metal contact strips, one in alignment with each slot. Each strip is so positioned and shaped that when the prongs on the plug are inserted into the socket each prong will be frictionally engaged by its associated strip. This frictional engagement normally is the only force relied upon to hold the two parts of the electrical connector in assembled relationship, and often proves adequate where the extension cords remain stationary and no axial pulling forces are exerted thereon, as when the electrical device connected with the cord is moved from one location to another in use.

Thus, in many applications of interconnected extension cords in homes, the electrical energy is supplied to a vacuum cleaner, an electric lawnmower, etc; and at airports, to a starter for an aircraft engine, portable air conditioning equipment etc. Further, at construction sites it is common practice to connect several extension cables together in order to transmit power to motor driven cement mixers, power tools, and the like. In applications such as these, the pull exerted on the conductors during movement thereof, is often sufficiently great to cause the connector portions to separate; similarly, the connectors are often disconnected when nonelectrical equipment is carelessly handled and catches thereon or personnel inadvertently trip thereover. The need for a more secure connection than is obtainable from the normal spring or frictional engagement of a plug and socket connection is thus readily apparent.

A number of devices have been proposed heretofore for securing electrical connectors or extension cords together. One type consists of little more than a closed, resilient loop which is slipped over the two parts of the electrical connector, and which is frictionally retained in position thereon. Because there is no positive clamping action present, this type often becomes displaced in use, or fails under pulling stress.

Examples of the prior art are shown in the U.S. Pat. No. 2,720,633, issued Oct. 11, 1955, and entitled "Clamp for Electrical Connectors;" U.S. Pat. No. 2,761,109, issued Aug. 28,1956, entitled "Safety-Type Clamp for Electric Plug and Socket;" U.S. Pat. No. 3,383,639, issued May 14,1968 entitled "Cord Extension Coupling Clamps;" and U.S. Pat. No. 3,223, 958, issued Dec. 14,1965 for "Clamp for Extension Cords."

SUMMARY OF THE INVENTION

The device of the present invention is positive in action, and firmly clamps the ends of the two extension cords together on opposite sides of the electrical connector, thereby overcoming the deficiencies of the resilient loop-type of connector.

In addition, the clamp of the present device can be quickly released for adjustment or removal from the cords simply by squeezing the clamps together and thereby releasing the clamps from a serrated or roughened rod which otherwise prevents relative displacement between the clamps.

More specifically, the present invention provides an extension cord coupling clamp which includes a pair of spring biased butterfly clamps that are mounted on a serrated, roughened or threaded rod so as to prevent relative accidental displacement of one clamp relative to the other. In order to adjust the clamps relative to one another, it is only necessary to press the butterfly clamp together, thereby releasing the clamp from its locking engagement with the roughened rod. Thus, the clamps of the present invention normally act to rigidly hold the coupling together and are prevented from accidental displacement, but they are easily adjusted simply by pressing the wing clamp together, thereby releasing them from the roughened or threaded rod.

These and other objects and advantages of the present invention will appear hereinafter as this disclosure progresses, reference being had to the accompanying drawings.

DESCRIPTION OF A PREFERRED EMBODIMENT

Figure 1:
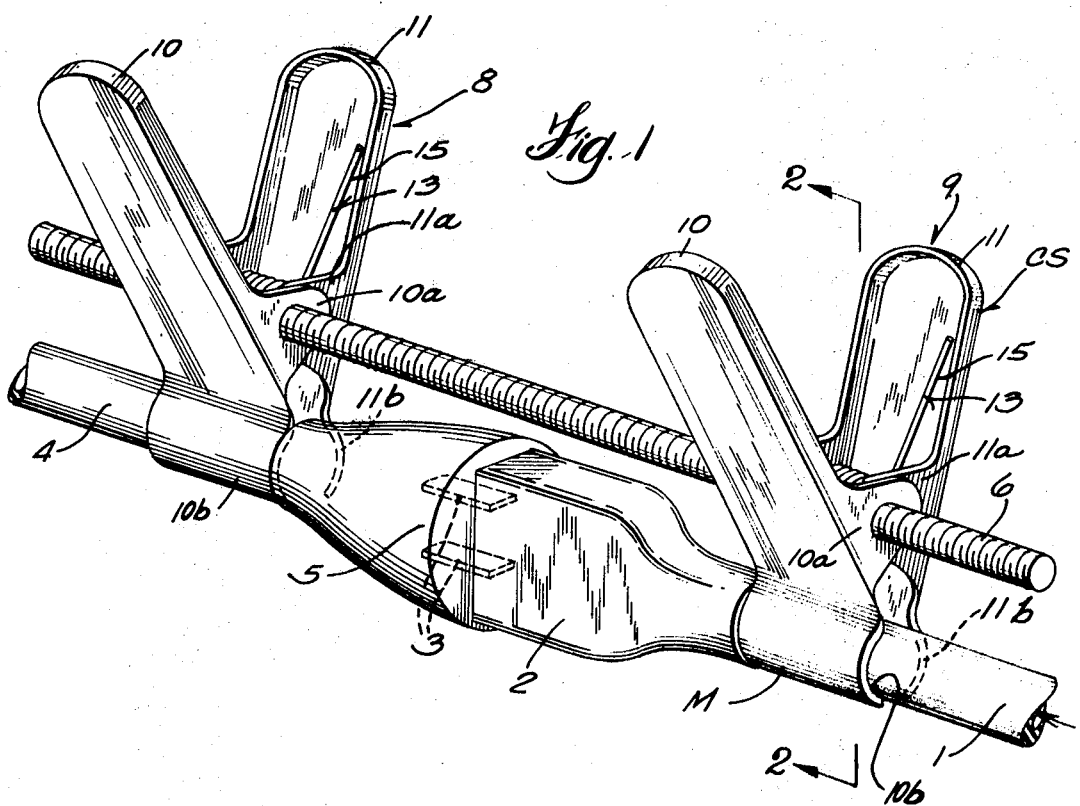
FIG. 1 is a perspective view of a coupling clamp assembly made in accordance with the present invention and as applied to an electrical extension cord.
Figure 2:
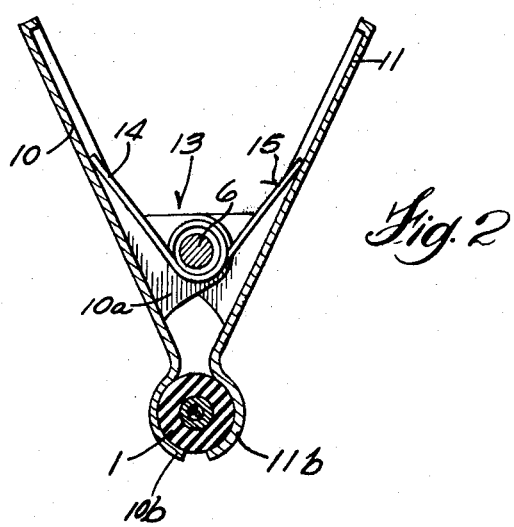
FIG. 2 is a cross-sectional view taken generally along the line 2—2 in FIG. 1.

The electric cord extension which is shown as utilizing the present invention includes a cord 1 having a plug end 2 with the conventional prongs 3 extending therefrom and another cord 4 has the socket end 5 into which the prongs are insertable. As above indicated, it is desirable to insure that the plug and socket connection is maintained so that when the operator or workman is a considerable distance from the connection, such as for example, at the upper end of a ladder or an elevated platform using a power tool, it will not be necessary for him to frequently reattach the connection if it accidentally becomes disconnected.

In accordance with the present invention, a clamp assembly CS is provided which includes an elongated rod 6, the surface of which is either roughened, formed with grooves, or as shown, formed with a thread along its length. The assembly also includes a spring biased clamp 8 and an identical spring biased clamp 9, these clamps each having complementary and cooperating members in the form of wings 10 and 11. The wings 10 and 11 are pivotally secured together intermediate their length by means of their inwardly turned flanges 10a and 11a, and which flanges have aligned apertures extending therethrough. These apertures are of such a size that they can be slid over the threaded rod if there is no pressure on the wings 10 and 11 tending to hold them apart.

It will be noted that a coil spring 13 is slipped over the rod and located between the wings and this spring has free ends 14 and 15 which abut against the inner sides of the wings 10 and 11, thus tending to spread them apart at their large ends by means of which they are grasped.

Other ends 10b and 11b of wings 10 and 11 are formed to provide a clamp and for this purpose are curved towards one another. The jaw ends 10b and 11b act together to tightly engage the cord between them. It will also be noted that the clamps 8 and 9 are located tightly against the enlarged portion of the cords so that when the clamps 8 and 9 are held tightly on the rod 6, the connection between the cords cannot be disengaged.

The clamps 8 and 9 are rigidly held on the rod 6 due to the action of the springs 13 which hold the flanges 10a and 11a tightly in the grooves or serrations of the rod 6 thereby preventing axial displacement along the rod 6.

In order to release the clamps 8 and 9 of the rod so that they can be adjusted along the length thereof, it is only necessary to press the wings 10 and 11 toward one another at the enlarged end thereby freeing the flanges 10a and 11a from their binding engagement with the grooves or threads of the rod 6.

In this manner, the clamps can be quickly adjusted without the use of special tools and yet at the same time positively hold the cords together.

The clamps are formed from being pressed of steel and are thus very rigid and do not yield or bend when the cord sections are attempted to be pulled apart.

I claim:

1. A clamp assembly for detachably holding a pair of cords together and comprising, a rod having an irregular surface, a pair of spring biased gripping clamps mounted intermediate their length on said rod, one clamp for engaging each of said cords, and spring means acting on said clamps to urge them into binding engagement with the irregular surface of said rod to prevent accidental movement of said clamps along said rod, one end of said clamps defining gripping jaw means for gripping said cords.

2. The assembly set forth in claim 1 further characterized in that the other end of said clamps constitute actuating portions which can be pressed together against the bias of the spring means located therebetween.

3. The assembly defined in claim 1 further characterized in that said spring means is a coiled spring through which said rod extends, said spring means having a pair of free ends bearing against said clamps.

4. The assembly defined in claim 2 further characterized in that said spring means is a coiled spring through which said rod extends, said spring means having a pair of free ends bearing against said clamps.

5. An extension cord clamp assembly for detachably holding a pair of cords together and comprising, a rod having an irregular surface along its length; a pair of spring biased clamps, one clamp for engaging each of said cords, said clamps each having a pair of complementary and cooperating members, said members having aligned holes intermediate their length, said rod extending through said holes, and spring means acting between the members of each pair of clamps and acting to urge said members into binding engagement with the irregular surface of said rod to prevent accidental movement of said clamps along said rod, one end of said members defining gripping jaw means for gripping said cords.

6. The assembly set forth in claim 5 further characterized in that the other end of said members constitutes actuating portions which can be pressed together against the bias of the spring means located therebetween.

7. The assembly defined in claim 6 further characterized in that said spring means is a coiled spring through which said rod extends, said spring means having a pair of free ends bearing against said cooperating members.

8. The assembly defined in claim 7 further characterized in that said spring means is a coiled spring through which said rod extends, said spring means having a pair of free ends bearing against said cooperating members.

9. An extension cord clamp assembly for detachably holding a pair of cords together and comprising, a rod having an irregular surface along its length; a pair of spring biased clamps, one clamp for engaging each of said cords, said clamps each having a pair of complementary and cooperating members, said members having inwardly turned flanges intermediate the length of said members, the flanges of one member overlapping the flanges of the other member of the same clamp, said flanges having aligned holes through which said rod extends, and spring means acting between the members of each pair of clamps and acting to urge said flanges into binding engagement with the irregular surface of said rod to prevent accidental movement of said clamps along said rod, one end of said members defining gripping jaw means for gripping said cords.

10. The assembly set forth in claim 9 further characterized in that the other end of said members constitutes actuating portions which can be pressed together against the bias of the spring means located therebetween.

11. The assembly defined in claim 10 further characterized in that said spring means is a coiled spring through which said rod extends, said spring means having a pair of free ends bearing against said cooperating members.

12. The assembly defined in claim 11 further characterized in that said spring means is a coiled spring through which said rod extends, said spring means having a pair of free ends bearing against said cooperating members.